(12) United States Patent
Kappler et al.

(10) Patent No.: US 7,012,122 B2
(45) Date of Patent: Mar. 14, 2006

(54) PROCESS FOR THE MANUFACTURE OF THERMALLY STABLE PVDF

(75) Inventors: Patrick Kappler, Ecully (FR); Veronique Gauthe, Ternay (FR)

(73) Assignee: Arkema, Puteaux (FR)

( * ) Notice: Subject to any disclaimer, the term of this patent is extended or adjusted under 35 U.S.C. 154(b) by 0 days.

(21) Appl. No.: 10/791,226

(22) Filed: Mar. 2, 2004

(65) Prior Publication Data

US 2004/0225095 A1 Nov. 11, 2004

(30) Foreign Application Priority Data

Mar. 3, 2003 (FR) ................................. 03 02531

(51) Int. Cl.
*C08F 116/12* (2006.01)
(52) U.S. Cl. ...................... 526/255; 526/242; 526/225; 526/89; 524/545
(58) Field of Classification Search .............. 526/255, 526/225, 242; 524/457, 545, 161
See application file for complete search history.

(56) References Cited

U.S. PATENT DOCUMENTS

| | | | |
|---|---|---|---|
| 3,728,303 A | 4/1973 | Kometani et al. | 524/401 |
| 4,025,709 A * | 5/1977 | Blaise et al. | 526/225 |
| 4,569,978 A | 2/1986 | Barber | 526/206 |
| 5,543,259 A * | 8/1996 | Schwarz et al. | 430/108.23 |
| 5,744,561 A * | 4/1998 | Kappler | 526/255 |
| 5,929,152 A | 7/1999 | Bromont et al. | 524/382 |
| 5,955,556 A | 9/1999 | Mccarthy et al. | 526/249 |
| 6,214,251 B1 * | 4/2001 | Wu et al. | 523/62.2 |
| 6,462,109 B1 * | 10/2002 | Sharma et al. | 523/501 |
| 6,780,935 B1 * | 8/2004 | Hedhli et al. | 525/191 |
| 2004/0225096 A1 * | 11/2004 | Kappler et al. | 526/255 |

FOREIGN PATENT DOCUMENTS

| | | |
|---|---|---|
| EP | 0 387938 B1 | 3/1990 |
| EP | 0 816397 B1 | 6/1997 |
| EP | 0 870792 A1 | 9/1998 |
| FR | 1298572 | 7/1961 |

* cited by examiner

Primary Examiner—David W. Wu
Assistant Examiner—Henry S. Hu
(74) Attorney, Agent, or Firm—Thomas F. Roland

(57) ABSTRACT

The present invention relates to a process for the manufacture of PVDF homopolymer or copolymer by radical polymerization of vinylidene fluoride (VDF), and optionally of a comonomer, in aqueous dispersion and in the presence of a transfer agent, of a persulphate as radical initiator, optionally of a surface-active additive and optionally of a paraffin wax, in which:
  a) sodium acetate is added, either at the start of or during or after the polymerization,
  b) a potassium alkylsulphonate is optionally added after the polymerization,
  c) an aqueous PVDF dispersion is obtained,
  d) the PVDF is collected by atomizing the dispersion obtained in c) with air at a temperature of between 120 and 220° C., the aqueous dispersion obtained in c) not being washed with water before atomizing.

6 Claims, No Drawings

PROCESS FOR THE MANUFACTURE OF THERMALLY STABLE PVDF

FIELD OF THE INVENTION

The present invention relates to a process for the manufacture of PVDF homopolymer or copolymer, more specifically to a process by radical polymerization of vinylidene fluoride (VDF), and optionally of a comonomer, in aqueous dispersion using a persulphate as initiator, in which sodium acetate is added. The polymerization is carried out optionally in the presence of a surface-active additive also referred to as an emulsifier or surfactant. The PVDF obtained should comprise as little as possible of this emulsifier and generally of the order of at most 300 ppm.

BACKGROUND OF THE INVENTION

Polymers based on vinylidene fluoride $CF_2=CH_2$ (VDF), such as, for example, PVDF (poly(vinylidene fluoride)), are known to offer excellent mechanical stability properties, very great chemical inertness and good resistance to ageing. These qualities are made use of in varied fields of application. Mention will be made, for example, of the manufacture of extruded or injection-moulded components for the chemical engineering or microelectronics industry, use in the form of sealing sheaths for the transportation of gases or of hydrocarbons, the production of films or coatings which make possible protection in the architectural field, and the production of protective components for electrical engineering uses.

U.S. Pat. No. 4,025,709 discloses the polymerization of VDF in the presence of potassium persulphate as initiator, of sodium acetate and of a dispersing additive which can be a sodium perfluorooctanoate (ex. 1–3) or a sulphonate of formula $Rf-C_2H_4-SO_3M$ in which M denotes an alkali metal or ammonium. The proportion of dispersing additive with respect to the PVDF formed is between 550 and 2200 ppm. The PVDF is obtained in the form of a latex which is dried in an oven or which is separated by centrifuging to produce the PVDF. There is no washing of the latex and the PVDF therefore comprises between 550 and 2200 ppm of dispersing additive. With this method of drying, the surface-active additive is not removed or is very partially removed, contrary to the claimed invention.

Patent EP 169 328 (U.S. Pat. No. 4,569,978) discloses the polymerization of VDF in the presence of diisopropyl peroxydicarbonate (IPP) as initiator and there is no sodium acetate. Patent EP 816 397 discloses a similar process to the above, except that the initiator is di-tert-butyl peroxide.

Patent EP 387 938 discloses the polymerization of VDF in the presence of ammonium persulphate as initiator and of ethyl acetate as chain-transfer agent without sodium acetate or dispersing additive.

U.S. Pat. No. 5,955,556 discloses the polymerization of VDF in the presence of an oxidizing-reducing couple but without dispersing additive or sodium acetate. The oxidizing agent can be a persulphate.

The PVDF manufactured according to the processes described above exhibits a thermal stability which is insufficient for applications requiring conversion by extrusion, compression moulding or injection moulding.

The prior art has also disclosed the incorporation of salts in PVDF in order to stabilize it thermally. Patent FR 1 298 572 discloses PVDF comprising barium or strontium salts. U.S. Pat. No. 3,728,303 discloses the polymerization of VDF in the presence of ammonium persulphate as initiator but without dispersing additive. Sodium chloride, potassium chloride, sodium chlorate or potassium chlorate is subsequently added to the PVDF. Patent EP 870 792 discloses the polymerization of VDF in the presence of persulphate as initiator and of a dispersing additive which is ammonium perfluorooctanoate. Potassium nitrate is added, either during the polymerization of the VDF or to the PVDF before it is introduced into an extruder. U.S. Pat. No. 5,929,152 discloses the improvement in the stability of PVDF by the addition of a bismuth salt.

It has now been found that by carrying out the polymerization in aqueous dispersion using a persulphate as initiator and that by adding sodium acetate and optionally a potassium alkylsulphonate, a PVDF which is very stable thermally is obtained, provided that the heat stability is not weakened by undesirable surfactant residues. The polymerization is optionally carried out in the presence of a surface-active additive in order to increase the amount of PVDF produced per polymerization batch but, in this case, the PVDF obtained should comprise a level of residual surface-active additive which is sufficiently low not to affect the heat stability. To achieve this low level of surfactant residue, it is sufficient to atomize the dispersion. This is because the surfactants have the property of being removed if the atomization temperature is sufficiently high. The content of surface-active additive should be less than 300 ppm by weight with respect to the PVDF to avoid a deterioration in the heat stability.

SUMMARY OF THE INVENTION

The present invention relates to a process for the manufacture of PVDF homopolymer or copolymer by radical polymerization of vinylidene fluoride (VDF), and optionally of a comonomer, in aqueous dispersion and in the presence of a transfer agent, of a persulphate as radical initiator, optionally of a surface-active additive and optionally of a paraffin wax, in which:

a) sodium acetate is added, either at the start of or during or after the polymerization, b) a potassium alkylsulphonate is optionally added after the polymerization, c) an aqueous PVDF dispersion is obtained, d) the PVDF is collected by atomizing the dispersion obtained in c) with air at a temperature of between 120 and 220° C., the aqueous dispersion obtained in c) not being washed with water before atomizing.

A PVDF is thus obtained which comprises sodium acetate and optionally a potassium alkylsulphonate and which comprises less than 300 ppm of surface-active additive. It also comprises chain ends:

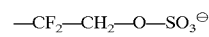

originating from the use of the persulphate as initiator. This PVDF is very stable thermally. The present invention also relates to this PVDF as novel product.

Depending on the nature of the surface-active additive and its proportions, the process is referred to as an "emulsion" process or any other process derived from the emulsion (microsuspension, miniemulsion, and the like) which can be carried out with persulphate as initiator, which processes are fully known to a person skilled in the art. After the end of the polymerization, the PVDF is separated from the water and the possible residues of the reactants charged.

In the case of the processes of emulsion type, the polymer exists in the form of a latex composed of very fine particles, the mean diameter of which is generally less than 1 micron. This latex can be coagulated and optionally concentrated by removing a portion of the water, for example by centrifugation. Certain surface-active additives optionally used in the polymerization can result in a deterioration in the heat stability if they remain present in the PVDF. The latex can then be dried and the surfactant can simultaneously be removed by bringing it into contact with a hot gas in an atomizer, and the PVDF powder is collected. This technique is known and used in processes for the manufacture of PVDF.

According to an advantageous form, the invention is a batchwise or semi-continuous process for the manufacture of PVDF homopolymer or copolymer, in which:

the polymerization reactor is charged with water, the optional surface-active additive and optionally a paraffin wax, the reactor is deaerated to remove the oxygen, the reactor is brought to the chosen temperature and VDF and the optional monomer are charged until the desired pressure is reached, the transfer agent is introduced into the reactor, either in its entirety or partly at the start of and partly during the polymerization, sodium acetate is added all at once or on several occasions, either at the start of or during or after the polymerization, the persulphate (the initiator) is added, in its entirety or in part, to start the polymerization and the fall in pressure which results therefrom is compensated for by the addition of VDF and of the optional comonomer, the possible remaining initiator is added during the polymerization, after introduction of the planned amount of VDF and of optional comonomer, the reactor is degassed and an aqueous PVDF dispersion is obtained, a potassium alkylsulphonate is optionally added, the aqueous PVDF dispersion is introduced into an atomizer with air at a temperature of between 120 and 220° C. and the PVDF powder is collected.

The temperature chosen is the temperature which is sufficient to polymerize the VDF and is of the order of 45 to 130° C. and advantageously between 70 and 90° C. The desired pressure is of the order of 35 to 125 bar.

The volume of water in which the dispersion of the monomers is prepared and the amounts of surface-active additive, of initiator and of transfer agent can be easily determined by a person skilled in the art. The polymerization is carried out in a stirred reactor.

DETAILED DESCRIPTION OF THE INVENTION

As regards the possible fluorinated comonomer, it is advantageously chosen from the compounds which comprise a vinyl group capable of opening by the action of free radicals to polymerize and which comprise, directly attached to this vinyl group, at least one fluorine atom, one fluoroalkyl group or one fluoroalkoxy group. Mention may be made, by way of example of comonomer, of vinyl fluoride; trifluoroethylene (TRFE); chlorotrifluoroethylene (CTFE); 1,2-difluoroethylene; tetrafluoroethylene (TFE); hexafluoropropylene (HFP); perfluoro(alkyl vinyl ether)s, such as perfluoro(methyl vinyl ether) (PMVE), perfluoro(ethyl vinyl ether) (PEVE) and perfluoro(propyl vinyl ether) (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)_nCH_2OCF=CF_2$ in which n is 1, 2, 3, 4 or 5; the product of formula $R1CH_2OCF=CF_2$ in which R1 is hydrogen or $F(CF_2)_z$ and z has the value 1, 2, 3 or 4; the product of formula $R3OCF=CH_2$ in which R3 is $F(CF_2)_z$— and z is 1, 2, 3 or 4; perfluorobutylethylene (PFBE); 3,3,3-trifluoropropene and 2-trifluoromethyl-3,3,3-trifluoro-1-propene. Several comonomers can be used. As regards the PVDF copolymer, the proportion of VDF is at least 60% by weight per 40% of comonomer and preferably at least 85% by weight per 15% of comonomer. The comonomer is advantageously chosen from HFP, CTFE, TFE and TRFE.

As regards the surfactant, in the emulsion processes, use is advantageously made of an ionic surfactant derived from an acid or one from a base which is organic. U.S. Pat. Nos. 4,025,709, 4,569,978, 4,360,652, EP 626 396 and EP 0 655 468 disclose processes for the synthesis of PVDF by aqueous emulsification of $VF_2$ and its polymerization; numerous formulae for surfactants are found therein.

Mention may be made, by way of example, of those of general formula: $ZC_nF_{2n}COOM$ in which Z is a fluorine or chlorine atom, n is an integer with a value from 6 to 13 and M is a hydrogen or alkali metal atom or an ammonium group or an ammonium group comprising at least one lower alkyl substituent.

Mention may also be made of lithium perfluoroalkanoates of formula $F_3C(CF_2)_{n-2}CO_2Li$ where n=7, 8, 9 and 10.

The total amount of surfactant introduced, at the start of or during polymerization, can be between 0 and 5000 ppm of the PVDF manufactured (substantially equal to the total charge of fluoromonomers employed).

Use is advantageously made of ammonium perfluorooctanoate and ammonium perfluorononanoate or their mixtures, that is to say the product of formula $ZC_nF_{2n}COOM$ in which Z is F, M is ammonium and mean n is between 8 and 9.

In the case where a surfactant is introduced at a level greater than 300 ppm by weight with respect to the PVDF, it is necessary to employ a specific drying process which makes it possible to partially remove it without removing the other water-soluble entities present (sodium acetate and possible potassium alkylsulphonate). When the PVDF in aqueous dispersion is not subjected to washing with water, which would simultaneously remove the surfactant as well as the sodium acetate and the possible potassium alkylsulphonate, the drying process used is the atomization of the aqueous PVDF dispersion. This is because it has been found that the surfactant was removed from the PVDF during atomization or at least greatly reduced to a content of less than 300 ppm with respect to the PVDF. The atomization is carried out with air between 120 and 220° C. and the solids content of the aqueous PVDF dispersion is advantageously between 15 and 30%. If the solids content of the dispersion at the end of the polymerization is greater than this range, water can be added thereto to dilute it. It is very clear that to add water is not a washing; in fact, there exist processes for the treatment of fine dispersions, such as latices, in which the latex is converted to a cream or aerated slurry over which water can be passed, the water not remaining in this cream, and then this cream can subsequently be diluted and dried, for example by atomization.

In the case where surfactant is not introduced or where an amount of less than 300 ppm is introduced, it is also possible to carry out drying by atomization to recover the PVDF.

The proportion of surfactant in the PVDF is determined by NMR analysis.

Advantageously, in addition to the surfactant, a paraffin wax is also added. The paraffin wax employed has a melting point ranging from 40 to 70° C. and represents from 0.005 to 0.05% by weight with respect to the total weight of the fluoromonomers.

As regards the initiator and therefore the persulphate, this is advantageously an alkaline persulphate and preferably a potassium or ammonium persulphate.

Advantageously, the radical initiator employed represents from 50 to 600 ppm and preferably 100 to 400 ppm by weight with respect to the total weight of the fluoromonomer or fluoromonomers employed.

NMR analysis has demonstrated chain ends:

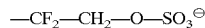
—CF$_2$—CH$_2$—O—SO$_3^{\ominus}$

It is possible to quantify the number of these chain ends by the ratio of their number per 1000 VDF units. This level depends on the molecular masses and on the amount of persulphate used. The polymer according to the invention has a level of chain ends as mentioned above of between 0.01 and 0.08 per 1000 VDF units.

As regards the transfer agent, this term is used to denote any product which makes it possible to limit the molar mass of the polymer while propagating the polymerization reaction. The transfer agents disclosed in the prior art for the preparation of PVDF are suitable. It generally exhibits a hydrogen bond sensitive to radical attack. Mention may be made, by way of example, of acetone, isopropanol, methyl acetate, ethyl acetate, diethyl ether, methyl tert-butyl ether, n-butyl acetate, diethyl malonate and diethyl carbonate and various chlorofluorocarbon compounds. The amount of transfer agent depends essentially on its nature and on the average molar mass desired for the polymer fraction obtained in its presence, which conditions the average viscosity of the final product. Preferably, the transfer agent employed represents from 0.05 to 5% by weight with respect to the PVDF manufactured. Advantageously, ethyl acetate is used.

The phenomenon of chain termination generates fully identifiable —CH$_2$—CF$_2$H and —CF$_2$—CH$_3$ endings The radical resulting from the transfer reaction reinitiates new chains in higher proportions than the radicals generated by the decomposition of the persulphate. This is the reason why the ends:

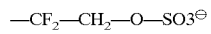
—CF$_2$—CH$_2$—O—SO3$^{\ominus}$ only represent 0.3 to 1% of all the chain ends detectable.

As regards the sodium acetate, use is advantageously made of the acetate trihydrate CH$_3$—COONa.3H$_2$O. The proportion, expressed as trihydrate, is advantageously between 50 and 600 ppm with respect to the PVDF manufactuered. The sodium introduced by the sodium acetate can be measured by X-ray fluorescence. It is expressed in Table 2 as ppm by weight of sodium with respect to the PVDF.

As regards the potassium alkylsulphonate (R—SO$_3$K), the proportion by weight with respect to the PVDF manufactured can be between 0 and 300 ppm. The alkyl groups R of this sulphonate are linear or branched and have from 1 to 11 carbon atoms. Ethyl, methyl, isopropyl and n-propyl are preferred. The proportion of alkylsulphonate in the PVDF is determined by NMR analysis.

Evaluation of the heat stability: A 260×20×4 mm plaque is formed from 40 g of (PVDF) powder by compression moulding under 30 bar and at 205° C. for 6 minutes and is subjected to quenching in water at 20° C. The plaque is subsequently reheated in a Metrastat® PSD 260 oven at 265° C. for 1 h. After this heat treatment, the plaque may be more or less coloured. The colour is determined by a yellowing measurement. The plaque is placed on a calibrated white ceramic and the yellowing index is measured with the help of a Minolta® CR 200 calorimeter using the ASTM D 1925 standard for the calculation of the yellow index.

The heat stability is also evaluated by a plaque moulding. The powder resulting from the drying of the latex is granulated in a Clextrale® BC 21 twin-screw corotating extruder at a temperature of 230° C. and a rotational speed of 120 revolutions per minute. A rod die makes it possible to prepare granules with a size of 4 mm. Using these granules, plaques with a diameter of 65 mm and a thickness of 3 mm are compressed at 230° C. for 9 min and 120 min at a pressure of 20 bar. The coloration of the plaques is measured with the help of a Minolta® CR 200 colorimeter using the ASTM D 1925 standard for the calculation of the yellow index.

EXAMPLES

Example 1

The following are introduced at ambient temperature into a 30 liter reactor:
21 liters of deionized water,
29 g of paraffin wax with a melting point of 60°C.,
1.8 g of sodium acetate trihydrate.

After closing and deaerating, stirring is begun and the reactor is heated to 83° C. After introducing 29 g of ethyl acetate, the reactor is pressurized to 85 bar with VDF. After injecting 180 g of a 0.5% by weight potassium persulphate solution, the polymerization begins and the pressure is maintained at 85 bar with VDF. After introducing 3500 g of VDF, a further 147 g of ethyl acetate and 180 g of a 0.5% by weight potassium persulphate solution are added. After introducing a total of 7600 g of VDF (time=2 h), the pressure is allowed to fall to 40 bar and the residual monomer is degassed. The latex is filtered and the excess paraffin wax is removed. The weight of latex obtained is 28.8 kg. The level of dry matter (or solids content) is 24%. 100 g of an aqueous solution comprising 0.5 g of potassium ethylsulphonate are added to the latex. The latex is subsequently diluted to a solids content of 20% and atomized using a Niro Minor Production® atomizer with an air inlet temperature of 140° C. and an air outlet temperature of 85° C. The throughput for evaporation of water is 7 kg/h. The powder obtained is subsequently granulated using a Clextral® BC 21 extruder at 230° C. and 120 rev/min.

Example 2

The following are introduced at ambient temperature into a 30 liter reactor:
17 liters of deionized water,
2 g of paraffin wax with a melting point of 60° C.,
22.6 g of a 15% solution of ammonium perfluorooctanoate.

After closing and deaerating, stirring is begun and the reactor is heated to 83° C. After introducing 88 g of ethyl acetate, the reactor is pressurized to 45 bar with VDF. After injecting 300 g of a 0.5% by weight potassium persulphate solution, the polymerization begins and the pressure is maintained at 45 bar with VDF. After introducing 1500 g of VDF, a further 100 g of a 0.5% by weight potassium persulphate solution are added. After introducing a total of 8500 g of VDF (time=4 h 30), the pressure is allowed to fall to 15 bar and the residual monomer is degassed. The latex is filtered. The weight of latex obtained is 26.4 kg. The level of dry matter (or solids content) is 30%. 100 g of an aqueous solution comprising 0.6 g of potassium ethylsulphonate and 2 g of sodium acetate are added to the latex. The latex is subsequently diluted to a solids content of 20% and atomized using a Niro Minor Production® atomizer with an air inlet temperature of 140° C. and an air outlet temperature of 85° C. The throughput for evaporation of water is 7 kg/h. The powder obtained is subsequently granulated using a Clextral® BC 21 extruder at 230° C. and 120 rev/min.

Example 3

The following are introduced at ambient temperature into a 30 liter reactor:
- 21 liters of deionized water,
- 1.4 g of paraffin wax with a melting point of 60° C.,
- 1.8 g of sodium acetate trihydrate,
- 8.5 g of a 15% solution of ammonium perfluorooctanoate.

After closing and deaerating, stirring is begun and the reactor is heated to 83° C. After introducing 29 g of ethyl acetate, the reactor is pressurized to 85 bar with VDF. After injecting 180 g of a 0.5% by weight potassium persulphate solution, the polymerization begins and the pressure is maintained at 85 bar with VDF. After introducing 3500 g of VDF, a further 147 g of ethyl acetate and 180 g of a 0.5% by weight potassium persulphate solution are added. After introducing a total of 7600 g of VDF (time=2 h), the pressure is allowed to fall to 40 bar and the residual monomer is degassed. The latex is filtered and the excess paraffin wax is removed. The weight of latex obtained is 29.2 kg. The level of dry matter (or solids content) is 25%. The latex is subsequently diluted to a solids content of 20% and atomized using a Niro Minor Production® atomizer with an air inlet temperature of 140° C. and an air outlet temperature of 85° C. The throughput for evaporation of water is 7 kg/h. The powder obtained is subsequently granulated using a Clextral® BC 21 extruder at 230° C. and 120 rev/min.

Example 4

It is analogous to Example 3; the only difference is the addition to the latex before atomization of 100 g of an aqueous solution comprising 0.5 g of potassium ethylsulphonate.

Example 5

It is analogous to Example 2; the only difference is that the addition of 0.6 g of potassium ethylsulphonate is not carried out.

Comparative Example 1

It is analogous to Example 1; the only difference is that neither the sodium acetate nor the potassium ethylsulphonate is added.

Comparative Example 2

It is analogous to Example 1; neither the sodium acetate nor the potassium ethylsulphonate is added. In contrast, 100 g of an aqueous solution comprising 7.2 g of sodium nitrate are added to the latex before atomization according to Patent EP 870 792.

Example 6

The following are introduced at ambient temperature into a 30 liter reactor:
- 17 liters of deionized water,
- 2 g of paraffin wax with a melting point of 60° C.,
- 52.8 g of a 15% solution of ammonium perfluorooctanoate.

After closing and deaerating, stirring is begun and the reactor is heated to 83° C. After introducing 88 g of ethyl acetate, the reactor is pressurized to 45 bar with VDF. After injecting 300 g of a 0.5% by weight potassium persulphate solution, the polymerization begins and the pressure is maintained at 45 bar with VDF. After introducing 1500 g of VDF, a further 100 g of a 0.5% by weight potassium persulphate solution are added. After introducing a total of 8500 g of VDF (time=4 h 30), the pressure is allowed to fall to 15 bar and the residual monomer is degassed. The latex is filtered. The weight of latex obtained is 26.4 kg. The level of dry matter (or solids content) is 30%. 100 g of an aqueous solution comprising 2 g of sodium acetate are added to the latex. The latex is subsequently diluted to a solids content of 20% and atomized using a Niro Minor Production® atomizer with an air inlet temperature of 140° C. and an air outlet temperature of 85° C. The throughput for evaporation of water is 7 kg/h. The powder obtained is subsequently granulated using a Clextral® BC 21 extruder at 230° C. and 120 rev/min.

Example 7

It is analogous to Example 6; the only difference is the addition to the latex before atomization of 100 g of a solution comprising 0.6 g of potassium ethylsulphonate. The results are in Tables 1 and 2 below.

TABLE 1

| Example | Water (kg) | Total VDF (kg) | Surfactant (g) | Pressure (bar) | Persulphate (g) | Sodium acetate (g) | K ethylsulphonate (g) | PVDF (kg) | Solids content | Poly. time |
|---|---|---|---|---|---|---|---|---|---|---|
| 1 | 21 | 7600 | 0 | 85 | 1.8 | 1.8 | 0.5 | 7200 | 25% | 2 h |
| 2 | 17 | 8500 | 3.4 | 45 | 2.0 | 2.0 | 0.6 | 8000 | 30% | 4 h 30 |
| 3 | 21 | 7600 | 1.3 | 85 | 1.8 | 1.8 | 0 | 6800 | 24% | 2 h |
| 4 | 21 | 7600 | 1.3 | 85 | 1.8 | 1.8 | 0.5 | 6800 | 24% | 2 h |
| 5 | 17 | 8500 | 3.4 | 45 | 2.0 | 2.0 | 0 | 8000 | 30% | 4 h 30 |
| Comp 1 | 21 | 7600 | 0 | 85 | 1.8 | 0 | 0 | 6800 | 24% | 2 h |
| Comp 2 | 21 | 7600 | 0 | 85 | 1.8 | 0 | 0 | 6800 | 24% | 2 h |
| 6 | 17 | 8500 | 7.9 | 45 | 2 | 2 | 0 | 7900 | 30% | 4 h 30 |
| 7 | 17 | 8500 | 7.9 | 45 | 2 | 2 | 0.6 | 7900 | 30% | 4 h 30 |

TABLE 2

| | Analytical characterization of the granules | | | | Heat stability YI | | Plaque moulding 9 min at 230° C. |
|---|---|---|---|---|---|---|---|
| Example | O—SO₃-ends per 1000 VDF | Residual surfactant ppm/PVDF | Na ppm/PVDF | Ethylsulphonate ppm/PVDF | Metrastat 1 h 265° C. | Plaque moulding 2 h at 230° C. | |
| 1 | 0.04 | 0 | 35 | 69 | 21 | 16 | 8 |
| 2 | 0.04 | 120 | 36 | 70 | 25 | 15 | 8 |
| 3 | 0.04 | <50 | 38 | 0 | 42 | 25 | 10 |
| 4 | 0.04 | <50 | 40 | 60 | 20 | 15 | 7 |
| 5 | 0.04 | 130 | 39 | 0 | 42 | 27 | 16 |
| Comp1 | 0.04 | 0 | 0 | 0 | 50 | 40 | 30 |
| Comp2 | 0.04 | 0 | 0 | 0 | 50 | 45 | 30 |
| 6 | 0.04 | 190 | 40 | 0 | 40 | 23 | 13 |
| 7 | 0.04 | 200 | 40 | 65 | 18 | 12 | 7 |

The invention claimed is:

1. Process for the manufacture of polyvinylidene fluoride (PVDF) homopolymer or copolymer comprising synthesizing by radical polymerization of vinylidene fluoride (VDF), and optionally of a comonomer, in aqueous dispersion and in the presence of a transfer agent, of a persulphate as radical initiator, optionally of a surface-active additive and optionally of a paraffin wax, in which:
   a) sodium acetate is added, either at the start of or during or after the polymerization,
   b) a potassium alkylsulphonate is optionally added after the polymerization,
   c) an aqueous PVDF dispersion is obtained,
   d) the PVDF is collected by atomizing the dispersion obtained in c) with air at a temperature of between 120 and 220° C., the aqueous dispersion obtained in c) not being washed with water before atomising.

2. Process according to claim 1, in which the surface-active additive is chosen from those of general formula: $ZC_nF_{2n}COOM$ in which Z is a fluorine or chlorine atom, n is an integer with a value from 6 to 13 and M is a hydrogen or alkali metal atom or an ammonium group or an ammonium group comprising at least one lower alkyl substituent.

3. Process according to claim 1, in which the proportion of sodium acetate is between 50 and 600 ppm with respect to the PVDF manufactured.

4. Process according to claim 1, in which the potassium alkylsulphonate is chosen from potassium ethylsulphonate, methyl-sulphonate, isopropylsulphonate or n-propylsulphonate.

5. Process according to claim 1, in which the proportion of potassium alkylsulphonate is between 0 and 300 ppm with respect to the PVDF manufactured.

6. The process of claim 1 wherein said radical polymerization process is a batchwise or semi-continuous process for the manufacture of PVDF homopolymer or copolymer, comprising the steps of:
   charging the polymerization reactor with water, the optional surface-active additive and optionally a paraffin wax,
   deaerating the reactor to remove the oxygen,
   bringing the reactor to the chosen temperature and VDF and the optional monomer are charged until the desired pressure is reached,
   introducing the transfer agent into the reactor, either in its entirety or partly at the start of and partly during the polymerization,
   adding sodium acetate all at once or on several occasions, either at the start of or during or after the polymerization,
   adding the persulphate (the initiator) in its entirety or in part, to start the polymerization and the fall in pressure which results therefrom is compensated for by the addition of VDF and of the optional comonomer,
   adding the possible remaining initiator during the polymerization,
   degassing the reactor and obtaining an aqueous PVDF dispersion after introduction of the planned amount of VDF and of optional comonomer,
   adding, optionally, a potassium alkylsulphonate, and
   introducing the aqueous PVDF dispersion into an atomizer with air at a temperature of between 120 and 220° C. and the PVDF powder is collected.

* * * * *